No. 650,850.　　　　　　　　　　　　　　　　Patented June 5, 1900.
J. M. MARTY, Jr.
VEHICLE HANDLE BAR.
(Application filed Feb. 28, 1900.)
(No Model.)　　　　　　　　　　　　　　　　2 Sheets—Sheet 1.
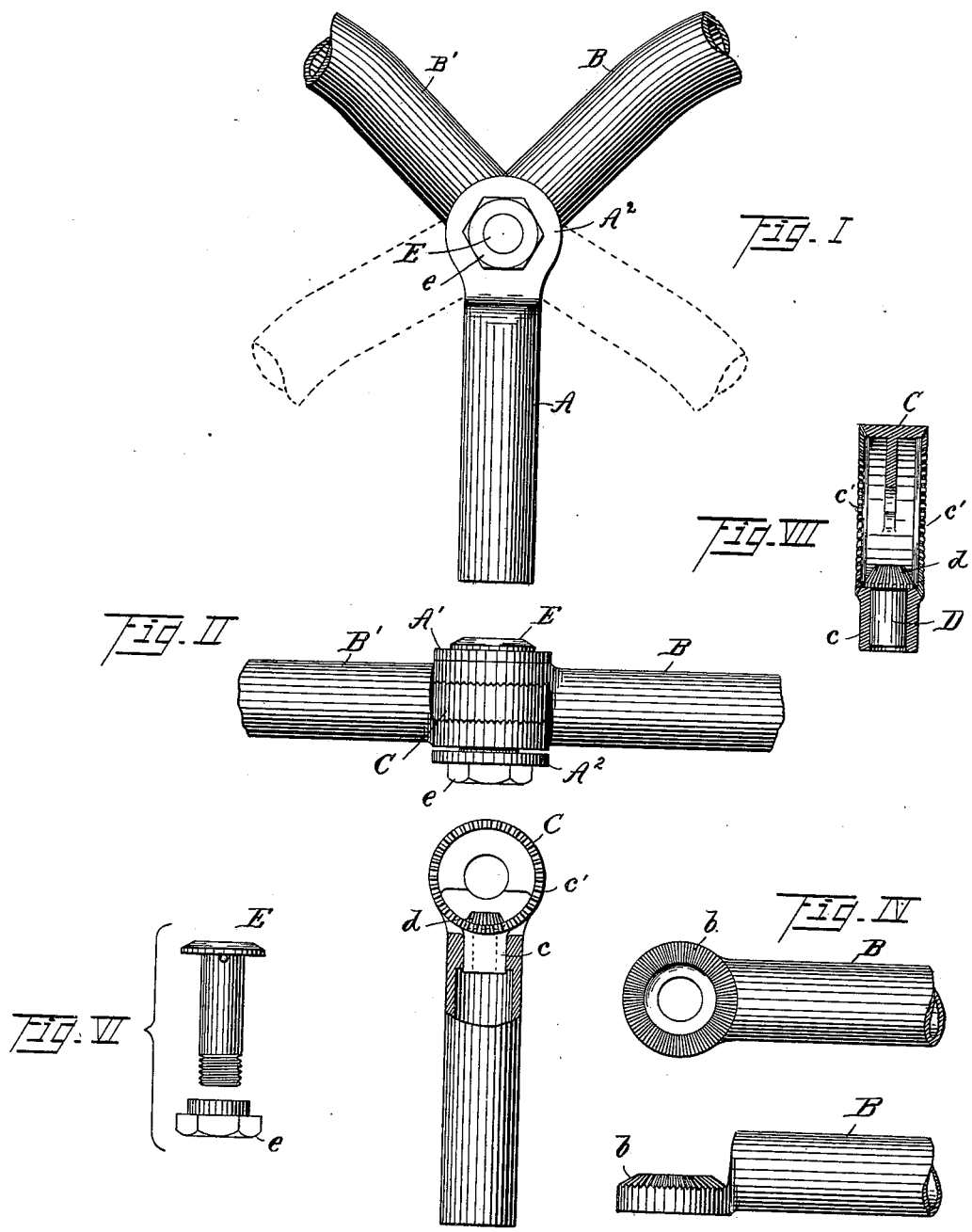
Witnesses:
Inventor
John M. Marty Jr
by Geo. B. Marty
his Attorney

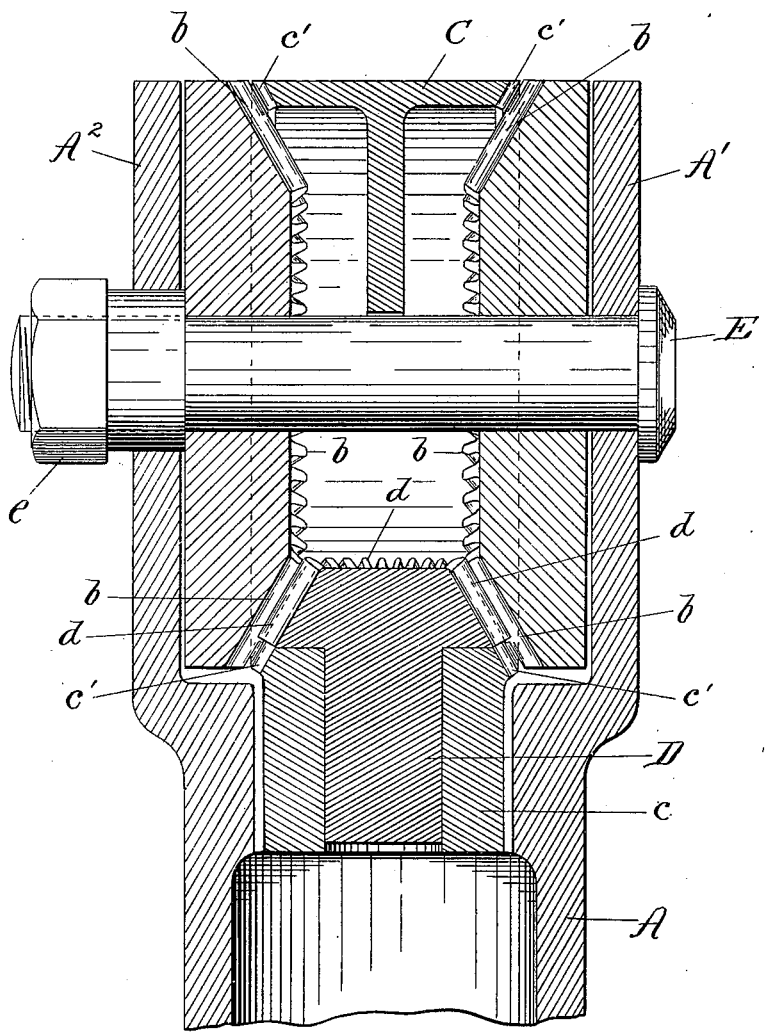
Fig. VIII

UNITED STATES PATENT OFFICE.

JOHN M. MARTY, JR., OF CLEVELAND, OHIO, ASSIGNOR TO DAVID A. DANGLER, OF SAME PLACE.

VEHICLE HANDLE-BAR.

SPECIFICATION forming part of Letters Patent No. 650,850, dated June 5, 1900.

Application filed February 28, 1900. Serial No. 6,876. (No model.)

*To all whom it may concern:*

Be it known that I, JOHN M. MARTY, Jr., a citizen of the United States, residing in the city of Cleveland, county of Cuyahoga, and State of Ohio, have invented certain new and useful Improvements in Vehicle Handle-Bars; and I hereby declare the following to be a full, clear, and exact description of the invention, such as will enable others skilled in the art to which it appertains to make and use the same.

My invention relates to vehicle handle-bars; and its object is to provide means for simultaneously adjusting the side arms to any desired position and for rigidly securing them when adjusted.

The mechanism consists of a stem supporting a pivot-pin on which the side arms are mounted. The inner or mounted ends of the side arms are disk-shaped and have serrations or teeth on their opposed surfaces, which mesh with a gear mounted between the arms. These serrations are the means of transmitting motion through the gear from one of the arms to the other and also the means for fastening the arms rigidly in the desired position. They extend entirely around the disk-shaped end of the bars, so that the side arms may be reversed and the bar changed from a drop-bar to a raised bar, or vice versa. A collar having serrations to engage the serrations on the side arms is mounted between them and also supports the gear.

In the accompanying drawings, Figure 1 is an elevation of my improved handle-bar. Fig. 2 is a plan view. Fig. 3 is an elevation, partly in section, of the stem, the collar mounted therein, and the gear mounted in the collar. Figs. 4 and 5 illustrate the teeth or serrations on the disk-shaped ends of the side arms. Fig. 6 shows the pivot-pin and the nut for clamping the parts together. Fig. 7 is a sectional view of the collar with the gear mounted therein. Fig. 8 is a sectional view of all of the parts assembled and showing the teeth of the gear still engaging the serrations on the side arms, while the side arms have been separated, so that their serrations no longer engage the truncated serrations on the collar, as hereinafter set forth.

A is the stem, which is of the bifurcated pattern, having the flanges A' A² for supporting the bolt E.

B B' are the side arms.

C is a collar mounted on the bolt E between the side arms, having a tailpiece $c$ extending downward into the stem and truncated serrations on each side to mesh with the serrations on the opposed surfaces of the side arms. The tailpiece $c$ prevents the collar from turning, but permits lateral movement of the collar on the pin E.

D is a gear mounted in the tailpiece $c$ of the collar C.

E is a bolt or pivot-pin mounted in the upper ends or flanges A' A² of the stem and supporting the side arms and the collar C.

$e$ is a nut screwed onto the end of the bolt E for clamping the parts together. This nut extends through the flange A² and bears against the side arm B'.

The essential feature of my invention lies in the means for conveying the motion of one side arm to the other, in connection with the means for clamping the parts together. The side arms are provided with serrations of a width equal to the width of the serrations $c'$ on the sides of the collar C and the face of the teeth $d$ on the gear D. The teeth on the gear may be made the full width of the serrations on the side arms. If constructed in this manner, the gear would be of a diameter equal to the full width of the collar and extend downward to the lower edge of the collar. The pitch of the serrations on the collar C is the same as the pitch of the teeth on the gear D, so that the inner part of the serrations on the side arms will mesh with the teeth of the gear D, while their outer part meshes with the serrations on the sides of the collar C. The bevel of the serrations on the collar C and on the side arms is the same as the bevel of the teeth on the gear D. The side arms are held in position by contact between their serrations and the serrations on the collar C, the parts being clamped together by the bolt E and the nut $e$. The upper part or point of the serrations on the collar C is removed, leaving the serrations on the collar truncated in form and about one-half the height of the teeth on the gear. The space between the flanges A' A² of the stem is just sufficient to permit disengagement of the truncated serrations on the collar and the serrations on the side arms, while the teeth of the gear still engage the serrations of the side arms, as shown in Fig. 8. In this manner by unscrewing the nut *e* the side arms are released from engagement with the collar C, but remain operatively connected with each other through the gear D and can be simultaneously adjusted to any desired position. By screwing up the nut *e* the serrations on the side arms and the collar again engage each other and the arms are secured in the desired position.

Having described my invention, I claim—

In a vehicle handle-bar the combination with the stem A of the arms B, B', mounted on the bolt E, the collar C mounted between the opposed surfaces of the arms and having truncated serrations to engage the serrations on the arms, the gear D meshing with the serrations on the side arms and operatively connecting the arms, and means for clamping the parts together, substantially as and for the purpose specified.

In testimony whereof I have hereunto set my hand in the presence of two witnesses.

JOHN M. MARTY, JR.

Witnesses:
R. M. GOURLEY,
FRANK S. MASTER.